United States Patent [19]

Mueller

[11] Patent Number: 4,638,097
[45] Date of Patent: Jan. 20, 1987

[54] REDUCING THE CONTENT OF CYCLIC OLIGOMERIC ETHERS IN POLYTETRAMETHYLENE ETHER GLYCOLS OR POLYOXYBUTYLENE POLYOXYALKYLENE GLYCOLS

[75] Inventor: Herbert Mueller, Frankenthal, Fed. Rep. of Germany

[73] Assignee: BASF Aktiengesellschaft, Ludwigshafen, Fed. Rep. of Germany

[21] Appl. No.: 842,467

[22] Filed: Mar. 21, 1986

[30] Foreign Application Priority Data

Apr. 23, 1985 [DE] Fed. Rep. of Germany ....... 3514547

[51] Int. Cl.[4] .............................................. C07C 41/38
[52] U.S. Cl. ..................................... 568/617; 568/621
[58] Field of Search ................................ 568/617, 621

[56] References Cited

U.S. PATENT DOCUMENTS

| | | | |
|---|---|---|---|
| 3,478,104 | 11/1964 | McConnell | 568/621 |
| 4,189,566 | 3/1980 | Mueller et al. | |
| 4,251,654 | 2/1981 | Robinson et al. | 568/617 |
| 4,500,705 | 2/1985 | Copelin | 568/621 |

FOREIGN PATENT DOCUMENTS

6107 11/1983 European Pat. Off.
854958 11/1960 United Kingdom.

*Primary Examiner*—Howard T. Mars
*Attorney, Agent, or Firm*—John H. Shurtleff

[57] ABSTRACT

The content of cyclic oligomeric ethers in polytetramethylene ether glycols or polyoxybutylene polyoxyalkylene glycols is reduced by a process in which a polytetramethylene ether glycol or polyoxybutylene polyoxyalkylene glycol which contains the said ethers and has a mean molecular weight of from 200 to 450 is mixed with a mixture of water and a hydrocarbon, and, after phase separation, the purified polytetramethylene ether glycol or polyoxybutylene polyoxyalkylene glycol is isolated from the aqueous phase.

7 Claims, No Drawings

REDUCING THE CONTENT OF CYCLIC OLIGOMERIC ETHERS IN POLYTETRAMETHYLENE ETHER GLYCOLS OR POLYOXYBUTYLENE POLYOXYALKYLENE GLYCOLS

The present invention relates to a process for reducing the content of cyclic oligomeric ethers in polytetramethylene ether glycols or polyoxybutylene polyoxyalkylene glycols by subjecting polytetramethylene ether glycols or polyoxybutylene polyoxyalkylene glycols containing cyclic oligomeric ethers to an extractive treatment with a mixture of water and a hydrocarbon.

Polytetramethylene ether glycols can be prepared, for example, by polymerization of tetrahydrofuran in the presence of a carboxylic anhydride and hydrolysis of the resulting polytetramethylene ether glycol carboxylic diesters (German Laid-Open Application DOS No. 2,801,578). Polyoxybutylene polyoxyalkylene glycols are obtainable, for example, by copolymerization of tetrahydrofuran and 1,2-alkylene oxides (British Patent No. 854,958). A disadvantage of this and other processes is that substantial amounts of low molecular weight products are formed in the polymerization or copolymerization of tetrahydrofuran.

These undesirable by-products contain, or consist of, oligomeric cyclic ethers. The amount of such compounds can be as high as 20% by weight. The said ethers are undesirable for a number of reasons. As inert compounds, they present problems in the further processing of the polymers, which, for example, are reacted with isocyanates to give polyurethanes. They act as softeners and in general cause a deterioration in the mechanical properties of the finished products. They may also exude at the surface of the finished products or be dissolved out by solvents, the dimensional stability of the finished products, for example, being among the properties adversely affected.

There has therefore been no lack of attempts to reduce the content of oligomeric cyclic ethers in polymers and copolymers of tetrahydrofuran. According to U.S. Pat. No. 4,127,513, a specially activated montmorillonite is used as a catalyst for the polymerization, in order to achieved this aim. The disadvantage of this process is that polymers having high color numbers are formed, and the polymerization rate is relatively low. For example, the copolymers thus obtained still contain from 5 to 6% by weight of oligomeric cyclic ethers. According to U.S. Pat. No. 4,228,272, the copolymerization of alkylene oxides with tetrahydrofuran is carried out using a particular bleaching earth catalyst. This process is supposed to give products having an improved color number at a greater polymerization rate. However, the copolymers obtained in this manner too still contain about 4% by weight of oligomeric cyclic ethers. This oligomer content is still too high to permit the polymers to be used for the preparation of polyurethanes, which have to meet fairly high mechanical requirements.

European Pat. No. 6,107 describes a process for reducing the content of oligomeric cyclic ethers in copolymers of tetrahydrofuran and alkylene oxides, in which the cyclic ethers are depolymerized with the aid of an acid-activated bleaching earth. In this process, in which the cyclic ethers are converted to tetrahydrofuran and various by-products, there is a danger that the open-chain glycols, i.e. the desired alkylene oxide copolymers, will also be depolymerized if the temperatures chosen are too high or the reaction times selected too long. This is always the case when it is intended to remove the undesirable oligomeric cyclic ethers as completely as possible. Reduced yields and the formation of colored polymers cannot be ruled out in this case.

British Pat. No. 854,958 states that unconverted monomers and low molecular weight oligomeric ethers which are formed as by-products in the copolymerization of tetrahydrofurans with epoxides can be removed by distillation under reduced pressure. However, this can be effected only down to a residual content of 5% by weight (cf. U.S. Pat. No. 4,251,654, column 1, lines 56 to 59).

Finally, U.S. Pat. No. 4,251,654 describes a process in which the oligomeric cyclic ethers are extracted from the crude polyoxybutylene polyoxyalkylene glycols with water. A combined extraction/distillation process is recommended for copolymers which have high contents or oligomeric cyclic ethers. The residual content of such ethers which is achieved in this procedure is about 3% by weight.

The homopolymerization of tetrahydrofuran to obtain polytetramethylene ether glycols (polytetrahydrofuran), which is known to be carried out using cationic catalysts, also gives cyclic oligomeric ethers. However, the amount obtained in this case is smaller than in the copolymerization of tetrahydrofuran; it depends furthermore on the mean molecular weight of the polymers prepared. Products having a mean molecular weight of about 1000 contain about 1–2% by weight, while those having a mean molecular weight of about 400 contain about 2–5% by weight of oligomeric cyclic ethers. Compounds of this type are mixtures of individual chemical compounds of the general formula

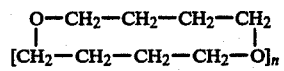

where n is a number of about 1 to 7, and the compounds present in the greatest concentrations in the mixture are those in which n is 2 to 4. These oligomeric cyclic ethers, which are referred to as crown ethers, cannot be separated from hydroxyl-containing compounds of similar molecular size by distillation. They are therefore frequently found as undesirable impurities in polytetrahydrofuran of low molecular weight.

Since low molecular weight polytetramethylene ether glycols or tetrahydrofuran/alkylene oxide copolymers having similar composition meet the high requirements set for chain extenders only when they are substantially free of cyclic and oligomeric ethers, there was a need for a process which makes it possible for the content of cyclic oligomeric ethers in polytetramethylene ether glycols or polyoxybutylene polyoxyalkylene glycols to be reduced very substantially, and which allows the particularly desirable low molecular weight polyalkylene ether glycols having a functionality of not less than 2 to be obtained in a form which is free of inert cyclic by-products.

We have found that the content of cyclic oligomeric ethers in polytetramethylene ether glycols or polyoxybuytlene polyoxyalkylene glycols can be reduced with substantially better results if polytetramethylene ether glycols or polyoxybutylene polyoxyalkylene glycols which contain the said ethers, are obtained by polymerization of tetrahydrofuran or copolymerization of tetrahydrofuran with alkylene oxide and have a mean molecular weight of from 200 to 450 are mixed with a mixture of water and a hydrocarbon, and, after phase separation, the purified polytetramethylene ether glycols or polyoxybutylene polyoxyalkylene glycols are isolated from the aqueous phase.

The starting materials used are polytetramethylene ether glycols or polyoxybutylene polyoxyalkylene glycols which can be obtained, for example, in a conventional manner by polymerization of tetrahydrofuran or by copolymerization of tetrahydrofuran with alkylene oxide, such as ethylene oxide, and have a mean molecular weight of from 200 to 450. The polytetramethylene ether glycols which are suitable starting materials contain about 1–15% by weight of oligomeric cyclic ethers. The copolymers of the stated type which are suitable starting materials contain from 2 to 50% by weight of the said ethers. The preparation of the polymers is described in, for example, British Pat. No. 854,958, U.S. Pat. No. 4,228,272 and the monograph entitled "Polytetrahydrofuran" by P. Dreyfuss, Gordon and Breach Science Publishers, New York, London, Paris, 1982.

Suitable hydrocarbons for the extraction process are both saturated and unsaturated aliphatic and cycloaliphatic compounds, as well as araliphatic and aromatic hydrocarbons, and the hydrocarbons may, for example, also contain substituents such as halogen atoms or alkoxy groups. Although in general preferred hydrocarbons are those which are liquid at room temperature, it is also possible to employ hydrocarbons having lower boiling points if the inconvenience of a procedure carried out under super-atmospheric pressure is accepted. Some of the lower-boiling hydrocarbons also give better results. Saturated and unsaturated, aliphatic hydrocarbons as well as araliphatic and aromatic hydrocarbons are preferred. Furthermore, any mixture of hydrocarbons may be used. For health reasons, aliphatic hydrocarbons and cycloaliphatic hydrocarbons are preferred. Examples of hydrocarbons are the following: saturated aliphatic and cycloaliphatic hydrocarbons, such as alkanes of 2 to 12 carbon atoms, e.g. butane, pentane and decane, cycloaliphatic hydrocarbons of 5 to 12 carbon atoms such as cyclopentane, cyclohexane, cyclooctane and cyclododecane, unsaturated aliphatic or cycloaliphatic hydrocarbons, such as alkenes of 4 to 12 carbon atoms, e.g. isobutene and cyclohexene, araliphatic hydrocarbons, such as ethylbenzene or isopropylbenzene, and aromatic hydrocarbons, such as benzene, toluene, xylene, chlorobenzene or naphthalene. Because it is readily available and because of its physiological and physical properties, cyclohexane is particularly preferred.

The polymeric starting materials are mixed with the mixture of water and hydrocarbon in general under atmospheric pressure and at up to 120° C., preferably from 15° to 50° C. The composition of the mixture of water and the hydrocarbon can be varied within wide limits. For example, mixtures which contain from 10 to 900, preferably from 30 to 300, parts by weight of hydrocarbon per 100 parts by weight of water can be used. The weight ratio of polymer to treatment mixture can also be chosen within wide limits. For example, from 5 to 300, preferably from 50 to 200, parts by weight of the mixture of water and hydrocarbon can be used per 100 parts by weight of polymer. The starting materials are mixed in a conventional stirred vessel, the stirring time per extraction step being about 1–30 minutes. After only one extraction stage, a substantial reduction in the content of the cyclic oligomeric ethers is achieved, so that the polymeric glycols can be obtained with a purity greater than 99%. Several extraction stages can be carried out, depending on the amount of cyclic oligomeric ethers to be extracted from the polymeric glycols. In general, extraction is carried out in from 1 to 3 stages and, in the multistage extraction, the water and the hydrocarbon recovered from the preceding extraction stage is reused. After extraction has been effected by mixing, the aqueous phase is separated from the organic phase, and the purified polytetramethylene ether glycols or polyoxybutylene polyoxyalkylene glycols are isolated from the aqueous phase, for example by distillation of the water. The cyclic oligomeric ethers are isolated from the organic phase, for example also by distillation. For example, the crown ethers can be obtained in pure form by a single extraction.

The novel process gives the components which are being separated in high purity in a particularly economical manner. This advantageous result is very surprising since the tetrahydrofuran/ethylene oxide polymers substantially freed from oligomeric cyclic ethers are obtained by the process described in U.S. Pat. No. 4,251,654, by extracting the polymeric starting materials with water. While in the conventional extraction process the cyclic oligomeric ethers become concentrated in the aqueous phase, they pass into the organic phase in the process of this invention. This result was just as unexpected as the fact that the intended reduction in the content of cyclic oligomeric ethers can be achieved with better results, i.e. more substantial removal, and greater cost-effectiveness by the process according to the invention.

In the Examples which follow, parts are by weight. Parts by weight bear the same relation to parts by volume as that of the kilogram to the liter.

EXAMPLE 1

15,000 parts of a low molecular weight polytetramethylene ether glycol which was obtained in a conventional manner by polymerization of tetrahydrofuran, had a hydroxyl number of 420 mg of KOH/g (corresponding to a mean molecular weight of 266) and contained about 4% by weight of oligomeric cyclic ethers were stirred thoroughly with 7500 parts of fully deionized water and 7500 parts of cyclohexane for one hour at 25° C. in a stirred vessel. The stirrer was then stopped, and the mixture separated into 2 phases. After 2 hours, 90% by weight of the lower phase was discharged from the stirred vessel, the material discharged not being contaminated with the lighter phase. To effect complete separation into a light phase and a heavy phase, the remainder of the mixture is discharged from the stirred vessel into a Florentine flask. 25.1% by weight of a clear upper phase and 74.2% by weight of a clear lower phase are obtained, the percentages in each case being based on the mixture employed. There are no losses due to poorly separating mixed phases.

Evaporation, initially under atmospheric pressure and then under reduced pressure at up to 130° C. under 1 mbar, showed that the upper organic phase consisted of about 93% of cyclohexane and 7% by weight of a colorless organic high boiler having a hydroxyl number of about 10 mg of KOH/g. Analysis by gas chromatography showed that the high boiler comprised 4.3% by area of 15-crown-3 ether, 30.6% by area of 20-crown-4 ether, 35.4% by area of 25-crown-5 ether and 21.2% by area of 30-crown-6 ether, 6.5% by area of 34-crown-7 ether and 2% by area of hydroxyl-containing glycols consisting of about equal amounts of dibutylene glycol, tributylene glycol, tetrabutylene glycol and pentabutylene glycol.

The lower aqueous phase consisted of about 2–3% by weight of cyclohexane, 27–28% by weight of water and about 70% of a polytetramethylene ether glycol having a hydroxyl number of 440 (corresponding to a mean molecular weight of 255). HPLC analysis and gas chromatography carried out using a temperature program showed that the content of oligomeric cyclic ethers in the polytetramethylene ether glycol purified in this manner was less than 1% by weight. Because of the low content of inert material, the resulting low molecular weight polytetramethylene ether glycol can be used directly as a chain extender in the preparation of polyurethanes. When the organic phase obtained in the extraction described above was separated into the extracting agent cyclohexane and polytetramethylene ether glycol by distillation, and the latter was extracted with the recovered cyclohexane and the water a second time, as described above, a polytetramethylene ether glycol was obtained which had a molecular weight of 252 and in which oligomeric cyclic ethers were no longer detectable.

EXAMPLE 2

The procedure described in Example 1 was followed, except that a low molecular weight polyoxybutylene polyoxyalkylene glycol obtained in a conventional manner by copolymerization of tetrahydrofuran and ethylene oxide (ethylene oxide content about 30% by weight), having a mean molecular weight of 350 and containing from 40 to 50% of oligomeric cyclic ethers was mixed with the mixture of water and cyclohexane. Phase separation gave 51% by weight of an upper phase and 49% of a lower phase.

The upper organic phase was separated into cyclohexane and organic high boilers by distillation under atmospheric pressure and under reduced pressure of 0.2 mbar at 120° C. The cyclohexane was kept for the second extraction described below. The upper cyclohexane phase obtained consisted of 51% by weight of the oligomeric cyclic ethers present in the starting material, the hydroxyl number of 67 mg of KOH/g showing that these ethers were scarcely contaminated with any hydroxyl-containing components. The lower phase, which contained a little cyclohexane, consisted of 51% by weight of water and 48% by weight of a low molecular weight copolymer of tetrahydrofuran and ethylene oxide, having a hydroxyl number of 220 mg of KOH/g. When the extractive treatment with a mixture of equal amounts of water and cyclohexane was repeated, the hydroxyl number of the copolymer treated in this manner increased to 300. It can be increased to 340 mg of KOH/g by a third extraction of the type described, after which it remains constant in any further extractive treatment. The purified polyoxybutylene polyoxyalkylene glycol obtained in this manner had a hydroxyl number of 340 mg of KOH/g and a molecular weight of about 330 and was free of oligomeric cyclic ethers.

We claim:

1. A process for reducing the content of cyclic oligomeric ethers in a polytetramethylene ether glycol or polyoxybutylene polyoxyalkylene glycol, wherein a polytetramethylene ether glycol or a polyoxybutylene polyoxyalkylene glycol which contains the said ethers and has a mean molecular weight of from 200 to 450 is mixed with a mixture of water and a hydrocarbon, and, after phase separation, the purified polytetramethylene ether glycol or polyoxybutylene polyoxyalkylene glycol is isolated from the aqueous phase.

2. A process as claimed in claim 1, wherein the purified polytetramethylene ether glycol or polyoxybutylene polyoxyalkylene glycol is obtained from the aqueous phase and the oligomeric cyclic ethers from the hydrocarbon phase by evaporation.

3. A process as claimed in claim 1, wherein the hydrocarbon used is an aliphatic or cycloaliphatic hydrocarbon.

4. A process as claimed in claim 1, wherein the hydrocarbon used is cyclohexane.

5. A process as claimed in claim 1, wherein the polymeric starting material is mixed with the mixture of water and a hydrocarbon under atmospheric pressure and at up to 120° C.

6. A process as claimed in claim 1, wherein the aqueous mixture contains from 10 to 900 parts by weight of hydrocarbon per 100 parts by weight of water.

7. A process as claimed in claim 1, wherein from 5 to 300 parts by weight of the mixture of water and a hydrocarbon are used per 100 parts by weight of polymer.

* * * * *